United States Patent [19]

Jarosak

[11] Patent Number: 4,941,231
[45] Date of Patent: Jul. 17, 1990

[54] LAWN MOWER ATTACHMENT

[76] Inventor: Robert D. Jarosak, 61 Birch Brook, Smithtown, N.Y. 11787

[21] Appl. No.: 386,721

[22] Filed: Jul. 31, 1989

[51] Int. Cl.$^5$ .................................................. A47L 9/10
[52] U.S. Cl. ...................................... 15/328; 15/339; 15/347; 56/DIG. 8
[58] Field of Search ................. 15/328, 338, 339, 347; 56/DIG. 8

[56] References Cited

U.S. PATENT DOCUMENTS

| | | | |
|---|---|---|---|
| 2,801,437 | 8/1957 | Okun | 15/328 X |
| 2,809,389 | 10/1957 | Collins et al. | 15/328 X |
| 3,199,277 | 8/1965 | Moody | 15/347 X |
| 3,624,989 | 12/1971 | Gatheridge | 15/347 X |
| 3,744,653 | 7/1973 | Jensen | 15/347 X |
| 3,903,565 | 9/1975 | Hicks | 15/347 X |

Primary Examiner—Chris K. Moore
Attorney, Agent, or Firm—Iman Abdallah

[57] ABSTRACT

A device for attachment to commercial lawn mowers which provides improved means for collection of spent debris. The device generally includes a debris chute which attaches to the lawn mower at its debris outlet, a gasoline-motor-driven mechanical blower and a debris collection receptacle. First and second sections of flexible tubing are utilized to respectively attach the chute and blower, and the blower and collection receptacle.

8 Claims, 2 Drawing Sheets

LAWN MOWER ATTACHMENT

BACKGROUND OF THE INVENTION

The present invention generally relates to commercial landscape equipment. More specifically, this invention relates to attachments for commercial lawn mowers for the collection of spent grass, leaves and the like.

Debris collection devices for commercial lawn mowers as known in the prior art are generally bulky which limits access to close quarters. This requires the use of additional time and additional equipment, for example smaller mowers or hand rakes, in order to maintain a landscape. Furthermore, when leaves are collected for disposal, because of their fluffy character, numerous baggings and dumpings are required for ultimate disposal. The presently known landscape equipment collection attachments also generally interfere with mower tire and belt changes. These and other disadvantages of the prior art are overcome by the collection attachment device of the present invention.

SUMMARY OF THE INVENTION

The present invention discloses a debris collection attachment for commercial lawn mowers which generally comprises in combination a debris chute, a mechanical blower, a gas-powered blower motor and debris collection means. The debris chute removably attaches to the debris outlet of the lawn mower and communicates with said blower by means of flexible tubing. Likewise, the blower and debris collection means communicate by means of flexible tubing. The debris collection means sits upon a support frame which is fixedly attached to the upper surface of the deck of said mower.

An object of the present invention is to provide a debris collection attachment device that permits mower access to close quarters without having to remove the collection device.

Another object of the present invention is to provide a debris collection attachment which mulches leaves during collection.

It is also an object of this invention to provide a debris collection attachment device which reduces landscape maintenance time.

These and other objectives and advantages of the present invention will be apparent to those skilled in the prior art from the following drawings, description of a preferred embodiment and claims.

DESCRIPTION OF A PREFERRED EMBODIMENT

Figure 1:
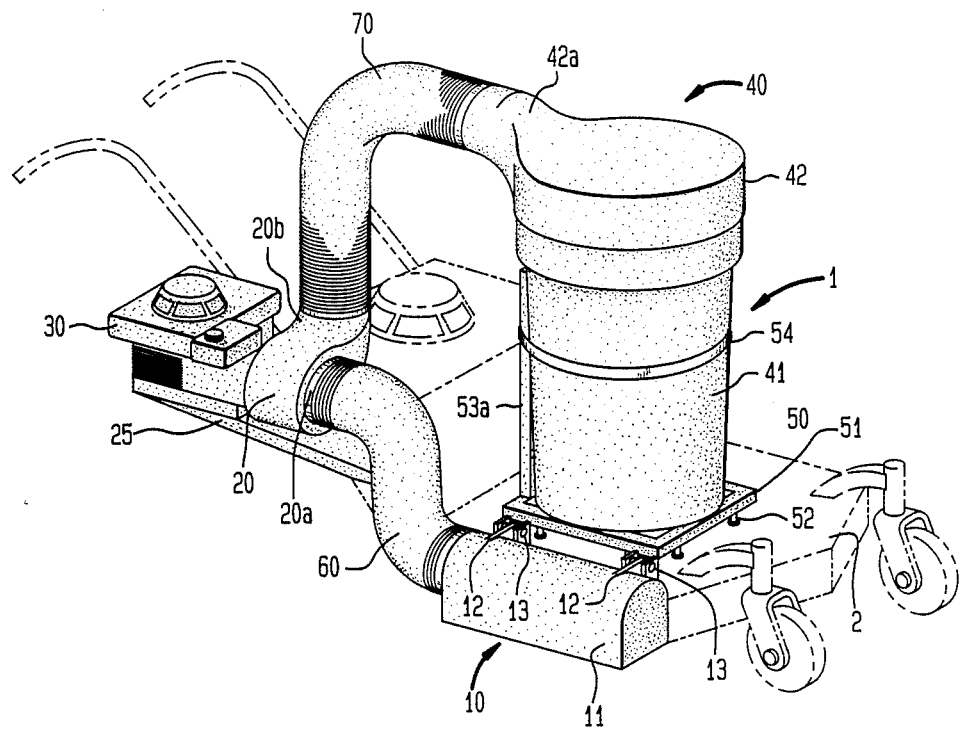
FIG. 1 is a perspective view of the present invention.

FIG. 1 illustrates in a side perspective view the general components of a preferred embodiment of the lawn mower attachment device 1 of the present invention. The device 1 includes a debris chute 10, a mechanical blower 20, a blower motor 30, a debris collector 40 and debris collector support means 50. The debris chute 10 and blower 20 communicate by means of a first section of flexible tubing 60, and the blower 20 and debris collector 40 communicate by means of a second section of flexible tubing 70. The device 1 attaches to a commercial lawn mower 2 as hereinafter described, said lawn mower 2 being illustrated throughout the drawings by faded lines.

Figure 2:
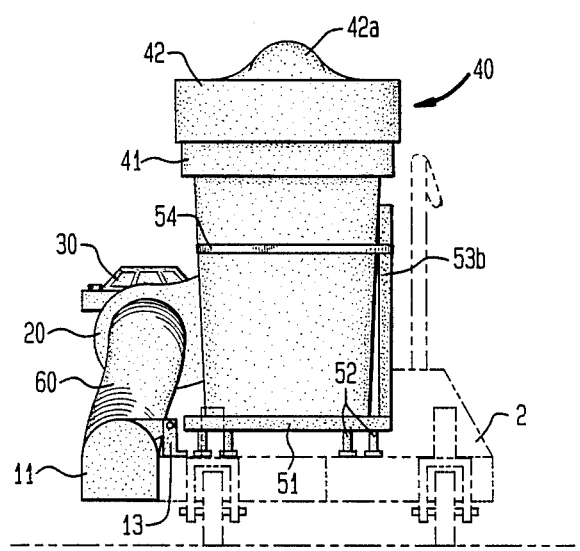
FIG. 2 is a front elevational view of the present invention.

Debris chute 10 is substantially an elongated housing member 11 which attaches at one side thereof adjacent to the debris outlet (not shown) of said lawn mower 2. The adjacently disposed side portion of said housing member 11 has an opening formed therein (not shown) which generally corresponds in size and shape to the debris outlet of said lawn mower 2. Housing member 11 includes flanges 12 which extend from the top portion of said housing member 11 to the side of the member 11 that is to be disposed adjacent to the debris outlet of said lawn mower 2. Flanges 12 rotatably engage chute support members 13, said support members 13 being fixedly attached to the upper surface of the deck of said lawn mower 2 (FIG. 2).

The first section of said flexible tubing 60 extends along the side of said mower 2 from the end of said housing member 11 to the inlet 20a of said blower 20. Blower 20 and blower motor 30 are disposed at a slightly higher elevation than chute 10 on the same side of the mower 2 and are held in place by a support table 25 which is removably attached to lawn mower 2 and extends outwardly therefrom. In the preferred embodiment blower 20 is a typical mechanical blower as already known in the prior art and blower motor 30 is a gasoline powered engine as known in the prior art. Blower motor 30 provides the driving force for operation of said blower 20.

The second section of said flexible tubing 70 extends above the lawn mower 2 from the outlet 20b of said blower 20 to said debris collector 40. Debris collector 40 generally comprises a receptacle 41 and receptacle cover 42. Collector 40 may be utilized in conjunction with a disposable plastic bag, said bag being placed within said receptacle 41. Receptacle cover 42 snugly engages the top portion of said receptacle 41. Receptacle cover 42 is formed in a manner to include a tubing engagement portion 42a to which said second section of flexible tubing 70 engages for communication of said collector 40 with said blower 20.

Figure 3:
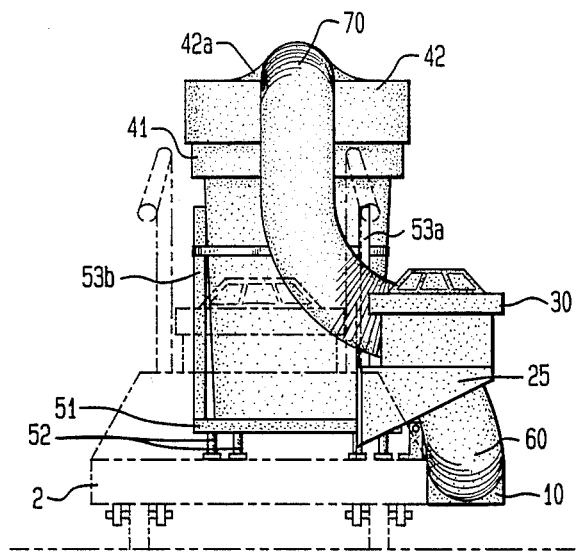
FIG. 3 is a rear elevational view of the present invention.

The collector support means 50 is substantially a frame member 51 having downwardly extending legs 52 which bear upon the upper surface of the deck of said lawn mower 2. Collector support means 50 further includes support arms 53a, 53b which extend upwardly from said frame member 51 alongside the receptacle 41. As best seen by reviewing FIGS. 1, 2 and 3 in succession, in the preferred embodiment of the invention there are two arms 53a, 53b included in said collector support means 50. A first arm 53a is attached to said frame member 51 in a manner such that it will be disposed to the rear of said receptacle 41, and a second arm 53b is attached to said frame member 51 in a manner such that it will be disposed to the side of said receptacle 41. By this construction the support means 50 can resists forces from either the front or rear of the receptacle 41. Collector support means 50 further includes a support belt 54, preferably formed from elastic material, which removably attaches to the arms 53a, 53b and extends about the periphery of the upper portion of said receptacle 41 thereby facilitating continued engagement of said receptacle 41 with said collector support means 50.

For operation of the collection attachment device 1 of the present invention, the support table 25 having blower 20 and blower motor 30 fixedly attached thereto is first attached to the deck of lawn mower 2. Debris chute 10 is then attached adjacent to the debris outlet of said lawn mower by engaging the flanges 12 of said housing member 11 with the chute support members 13 which may be permanently attached to the deck of said lawn mower 2. If support members 13 are not permanently attached to the deck of said lawn mower 2 then these members 13 would be attached to the lawn mower 2 prior to engaging the flanges 12 thereto. Collector support means 50 is then attached to said lawn mower 2 by fixedly attaching the legs 52 of said support frame 51 to the upper surface of the deck of said lawn mower 2. Receptacle 41 and attached receptacle cover 42 are then placed upon the top portion of said support frame 51 adjacent to the support arms 53a, 53b and support belt 54 is pulled around receptacle 41 and attached to the support arms 53a, 53b. The first and second sections of flexible tubing 60, 70 are respectively attached at each end thereof to said debris chute 10 and said blower inlet 20a, and said blower outlet 20b and the tubing engagement portion 42a of said receptacle cover 42. As the lawn mower 2 is utilized to cut grass and the like, the blower motor 30 is started up to drive blower 20. The spent debris from the lawn mower 2 which exits the debris outlet of the mower 2 into chute 10 is pulled therefrom through said first section of flexible tubing 60 to said blower 20 and forced therefrom through said second section of flexible tubing 70 into the receptacle 41 of said collection means 40.

Therefore in view of the foregoing, I claim:

1. A debris collection device for attachment to a lawn mower providing means to collect spent debris, comprising in combination
    a debris chute removably attachable to said lawn mower having one side thereof disposed adjacently to the debris outlet of said lawn mower;
    a mechanical blower;
    driving means for said blower;
    a debris collector;
    debris collector support means disposed upon the upper surface of the deck of said lawn mower providing means for bearing support of said debris collector;
    a first section of flexible tubing which provides means for communication of said debris chute and said blower; and
    a second section of flexible tubing which provides means for communication of said blower and said debris collector.

2. A debris collection device as described in claim 1 wherein said debris chute comprises an elongated housing member having flanges extending from one side thereof which engage chute support members, said chute support members being fixedly attached to the upper surface of the deck of said lawn mower, said housing member having an opening formed in the side thereof which is disposed adjacent to the debris outlet of said lawn mower.

3. A debris collection device as described in claim 1 wherein said debris collector comprises in combination a receptacle and a receptacle cover, said receptacle cover having an integrally formed tubing engagement portion, said receptacle and receptacle cover being complimentarily formed in a manner to permit snug engagement of said receptacle cover with said receptacle.

4. A debris collection device as described in claim 3 wheren said collector support means comprises a frame member having a plurality of downwardly extending legs which are fixedly attachable to the upper surface of the deck of said lawn mower, and a pair of upwardly extending arms which are attached to said frame member in a manner such that a first arm is disposed to the rear of said receptacle and a second arm is disposed to the side of said receptacle when said debris collector is positioned in bearing relationship with said frame member.

5. A debris collection device as described in claim 4 further including a support belt which attaches to the arms of said collector support means and extends about the periphery of said debris collector in a manner to facilitate continued bearing relations of said debris collector and said collector support means.

6. A debris collection device as described in claim 1 further including a support belt which attaches to said collector support means and extends about the periphery of said debris collector in a manner to facilitate continued bearing relations of said debris collector and said collector support means.

7. A debris collector device for attachment to a lawn mower providing means to collect spent debris, comprising in combination
    a debris chute removably attachable to said lawn mower having one side thereof disposed adjacently to the debris outlet of said lawn mower, said debris chute comprising an elongated housing member having flanges extending from one side thereof which engage chute support members, said chute support members being fixedly attached to the upper surface of the deck of said lawn mower, said housing member having an opening formed in the side thereof which is disposed adjacent to the debris outlet of said lawn mower;
    a mechanical blower;
    gasoline-powdered driving means for said blower;
    a debris collector, said debris collector comprising in combination a receptacle and a receptacle cover, said receptacle cover having an integrally formed tubing engagement portion, said receptacle and receptacle cover being complimentarily formed in a manner to permit snug engagement of said receptacle cover with said receptacle;
    debris collector support means disposed upon the upper surface of the deck of said lawn mower providing means for bearing support of said debris collector, said collector support means comprising a frame member having a plurality of downwardly extending legs which are fixedly attachable to the upper surface of the deck of said lawn mower, and a pair of upwardly extending arms which are attached to said frame member in a manner such that a first arm is disposed to the rear of said receptacle and a second arm is disposed to the side of said receptacle when said debris collector is positioned in bearing relationship with said frame member;
    a first section of flexible tubing which provides means for communication of said debris chute and said blower; and
    a second section of flexible tubing which provides means for communication of the outlet of said blower and the tubing engagement portion of the receptacle cover of said debris collector.

8. A debris collection device as described in claim 7 further including a support belt which attaches to the arms of said collector support means and extends about the periphery of said debris collector in a manner to facilitate continued bearing relations of said debris collector and said collector support means.

* * * * *